A. SCHMIDT.
SPARK PLUG.
APPLICATION FILED JUNE 29, 1917.

1,283,573.

Patented Nov. 5, 1918.

Inventor
Albert Schmidt

By Whittemore Hulbert & Whittemore
Attorneys

UNITED STATES PATENT OFFICE.

ALBERT SCHMIDT, OF FLINT, MICHIGAN, ASSIGNOR TO CHAMPION IGNITION COMPANY, OF FLINT, MICHIGAN, A CORPORATION OF MICHIGAN.

SPARK-PLUG.

1,283,573.  Specification of Letters Patent.  Patented Nov. 5, 1918.

Application filed June 29, 1917. Serial No. 177,671.

*To all whom it may concern:*

Be it known that I, ALBERT SCHMIDT, a citizen of the Republic of France, residing at Flint, in the county of Genesee and State of Michigan, have invented certain new and useful Improvements in Spark-Plugs, of which the following is a specification, reference being had therein to the accompanying drawings.

The invention relates to spark-plugs and has particular reference to the means for forming a gas-tight seal between the electrode and the insulator passing therethrough. Heretofore sealing joints between the electrode and the outer end of the insulator have been formed in various ways, such as by the use of a compressible gasket and equivalent means. It is difficult to maintain a gas-tight seal directly between the electrode and insulator, as the latter is never provided with a true surface. I have devised a simple expedient for forming such a seal which consists in metallizing or otherwise providing the end of the insulator with a conducting surface and after the insertion of the electrode placing in an electrolytic bath and depositing metal thereon. This will cause the filling of any crevice between the electrode and the metallized surface of the insulator until a perfect seal is formed.

A is the insulator and B the electrode, which latter is provided with a collar or bearing C for contacting with the outer end of the insulator. The electrode may be retained in the insulator by any suitable means, this forming no part of the present invention.

Figure 1:
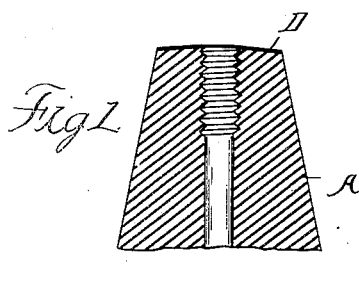
Figure 1 is a section through the outer end portion of an insulator indicating the portion of the surface thereof which has been metallized.
Figure 2:
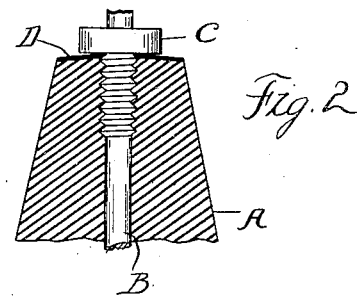
Fig. 2 is a section through the joint after the insulator is placed in the electrode.
Figure 3:
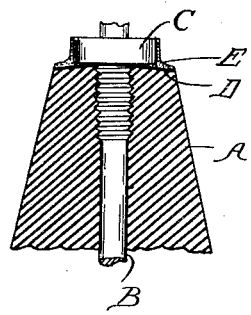
Fig. 3 is a similar view after the electrolytic treatment has sealed the joint.

To form the sealing joint the end of the insulator is first metallized, as indicated at D. The electrode B is then placed in position and secured, the collar C bearing against the end of the insulator but not forming a gas-tight seal. The structure is then immersed in an electrolytic bath and metal is deposited on the end of the electrode and the metallized surface of the insulator until all spaces therebetween are completely filled, as indicated in Fig. 3. This will result in a perfect gas seal.

What I claim as my invention is:

1. In a spark-plug, the combination with an insulator and an electrode passing therethrough, of an electrolytic deposit between the electrode and insulator forming a gas-tight seal.

2. In a spark-plug, the combination with an insulator and an electrode passing therethrough, of a metallized surface on the end of said insulator, a shoulder on said electrode adjacent to said metallized surface, and an electrolytic deposit between said shoulder and metallized surface forming a gas-tight seal.

3. The method of forming a sealing joint between an insulator and an electrode passing therethrough, comprising the metallizing of the insulator, the placing of the electrode with a portion thereof adjacent to said metallized surface and electrolytically depositing metal between said surface and electrode.

4. The method of forming a sealing joint between an insulator and an electrode passing therethrough and having a collar adjacent to the end of the insulator, comprising the metallizing of the end of the insulator and the electrolytic depositing of metal between said surface, electrode and collar.

In testimony whereof I affix my signature.

ALBERT SCHMIDT.